US011403150B1

(12) United States Patent
Featonby et al.

(10) Patent No.: US 11,403,150 B1
(45) Date of Patent: Aug. 2, 2022

(54) REPLENISHMENT-AWARE RESOURCE USAGE MANAGEMENT

(71) Applicant: Amazon Technologies, Inc., Seattle, WA (US)

(72) Inventors: Malcolm Featonby, Sammamish, WA (US); Mats Lanner, Seattle, WA (US); Archana Srikanta, Seattle, WA (US); Carlos Eduardo Lopez Biagi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 16/909,756

(22) Filed: Jun. 23, 2020

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 9/45541* (2013.01); *G06F 2009/45595* (2013.01); *G06F 2209/509* (2013.01); *G06F 2209/5011* (2013.01)

(58) Field of Classification Search
CPC .............. G06F 9/5077; G06F 9/45558; G06F 9/45541; G06F 2009/45595
See application file for complete search history.

(56) References Cited

U.S. PATENT DOCUMENTS

| | | | |
|---|---|---|---|
| 9,256,467 B1 | 2/2016 | Singh et al. | |
| 9,549,038 B1 | 1/2017 | Anne | |
| 9,910,713 B2 | 3/2018 | Wisniewski et al. | |
| 9,928,108 B1* | 3/2018 | Wagner | G06F 9/45533 |
| 10,067,801 B1 | 9/2018 | Wagner | |
| 10,432,551 B1 | 10/2019 | Vosshall et al. | |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 2012/0210326 A1 | 8/2012 | Torr et al. | |
| 2013/0124807 A1* | 5/2013 | Nielsen | G06F 11/1438 |
| | | | 711/162 |

(Continued)

OTHER PUBLICATIONS

Paolo Dettori; Blueprint for Business Middleware as a Managed Cloud service; 2014 IEEE (Year: 2014).*

(Continued)

*Primary Examiner* — Dong U Kim
(74) *Attorney, Agent, or Firm* — Knobbe, Martens, Olson & Bear, LLP

(57) ABSTRACT

Provided is a system for managing the resource limit associated with a user, where the resource limit indicates the amount of compute resources the user is allowed to use. As the user requests and obtains additional resources from a pool of resources, the user's resource usage is increased to reflect the additional resources being used by the user. As the resources used by the user are released, to ensure that the pool of resources has sufficient capacity to handle additional resource requests, the replenishment status of the pool is further checked, and if the replenishment status satisfies a condition for updating the user's resource usage, the user's resource usage is decreased to reflect the resources that are no longer in use by the user. The released resources are torn down and re-provisioned back into the pool of resources.

20 Claims, 7 Drawing Sheets

(56) References Cited

U.S. PATENT DOCUMENTS

| | | |
|---|---|---|
| 2013/0160008 A1 | 6/2013 | Cawlfield et al. |
| 2014/0358710 A1 | 12/2014 | Balestrieri et al. |
| 2015/0106805 A1* | 4/2015 | Melander ............... G06F 9/5072 718/1 |
| 2015/0142878 A1 | 5/2015 | Hebert et al. |
| 2016/0077846 A1 | 3/2016 | Phillips et al. |
| 2016/0378559 A1 | 12/2016 | Bhandarkar et al. |
| 2017/0078433 A1 | 3/2017 | Radhakrishnan et al. |
| 2017/0090961 A1* | 3/2017 | Wagner ............... G06F 9/45533 |
| 2017/0177413 A1* | 6/2017 | Wisniewski .......... G06F 9/5027 |
| 2017/0177860 A1 | 6/2017 | Suarez et al. |
| 2017/0339158 A1 | 11/2017 | Lewis et al. |
| 2017/0339196 A1 | 11/2017 | Lewis et al. |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0150325 A1* | 5/2018 | Kuo ..................... G06F 9/5005 |
| 2018/0246745 A1 | 8/2018 | Aronovich et al. |
| 2018/0331971 A1 | 11/2018 | Certain et al. |
| 2019/0102231 A1* | 4/2019 | Wagner ................ G06F 9/5027 |
| 2019/0108049 A1 | 4/2019 | Singh et al. |
| 2019/0294477 A1 | 9/2019 | Koppes et al. |
| 2019/0324786 A1 | 10/2019 | Ranjan et al. |
| 2019/0340033 A1 | 11/2019 | Ganteaume |
| 2020/0073649 A1 | 3/2020 | Viana et al. |
| 2020/0142711 A1 | 5/2020 | Varda et al. |
| 2020/0174842 A1 | 6/2020 | Wang et al. |
| 2020/0213279 A1 | 7/2020 | Xiong et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0358719 A1 | 11/2020 | Mestery et al. |
| 2020/0412596 A1 | 12/2020 | Cherunni |
| 2021/0064442 A1 | 3/2021 | Alluboyina et al. |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0158083 A1 | 5/2021 | Gan et al. |
| 2021/0160162 A1 | 5/2021 | Abbas |
| 2021/0184942 A1 | 6/2021 | Tootaghaj et al. |

OTHER PUBLICATIONS

U.S. Appl. No. 16/217,454, filed Dec. 12, 2018, Aithal et al..
U.S. Appl. No. 16/367,801, filed Mar. 28, 2019, Featonby et al..
U.S. Appl. No. 16/699,309, filed Nov. 29, 2019, Goodman et al..
U.S. Appl. No. 16/909,756, filed Jun. 23, 2020, Featonby et al..

* cited by examiner

REPLENISHMENT-AWARE RESOURCE USAGE MANAGEMENT

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
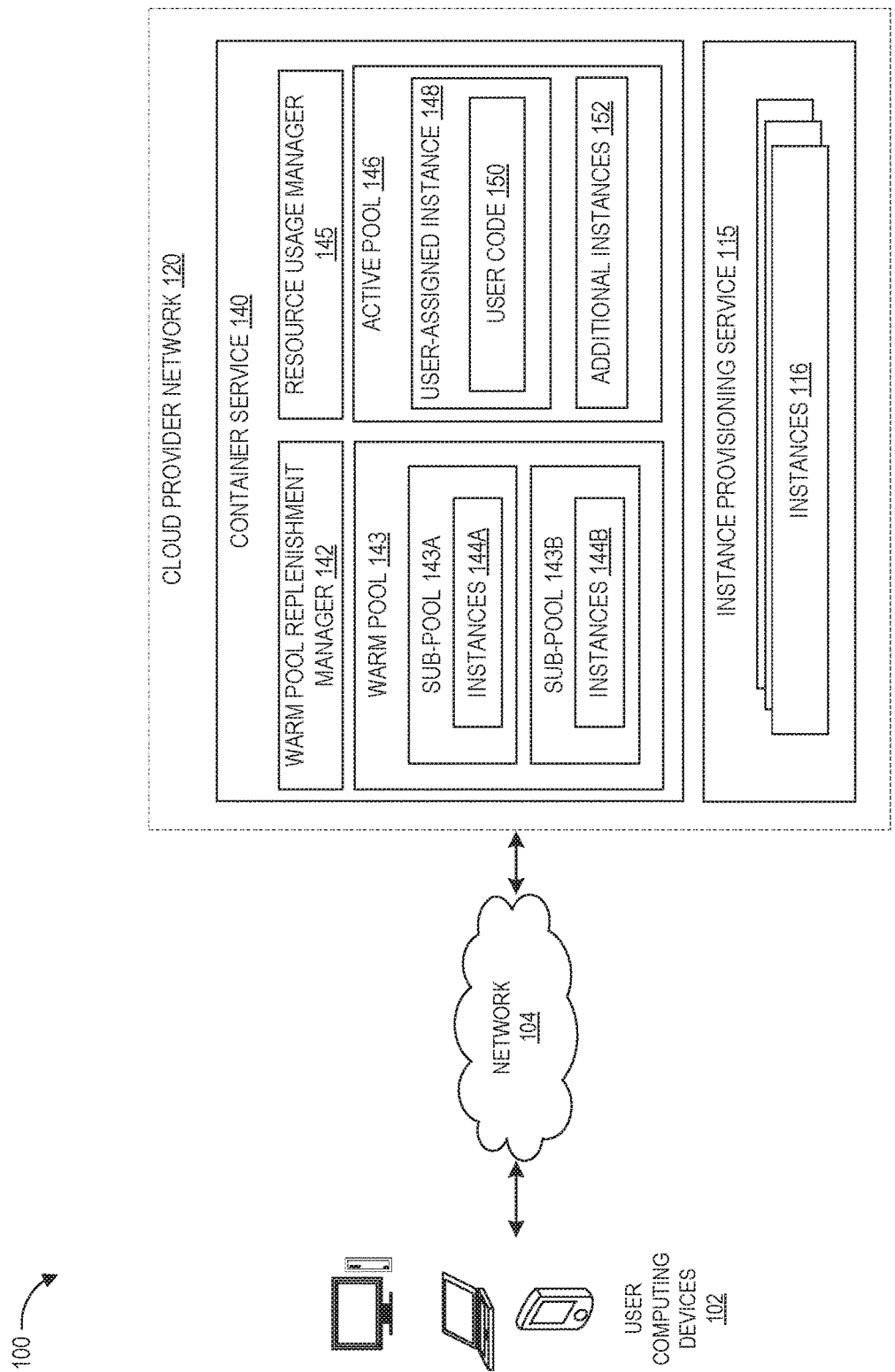
FIG. 1 depicts a schematic diagram of a network environment in which a cloud provider network is used to implement a container service and a task definition generator in accordance with aspects of the present disclosure.

A developer can package a software application and everything else needed to run the application in a container image (e.g., a standalone, executable package of software that includes everything needed to run an application process) and send a request to a distributed computing environment such as a cloud provider network to execute the application using compute capacity provided by the cloud provider network. To handle such execution requests, the cloud provider network may maintain a pool of compute instances that can each be assigned to a user of the cloud provider network for executing a task on behalf of the user. Further, to ensure that there is a sufficient number of compute instances available in the pool, the cloud provider network may define a resource limit (e.g., a maximum number of compute instances that can be concurrently assigned to a single user) for each user, and prevent the users from exceeding their respective resource limits.

However, in some cases, if a user requests and releases compute resources too quickly (e.g., to retry a task launch that continues to fail), the pool of resources from which the compute resources are acquired may not be able to replenish the removed compute resources fast enough, and may eventually run out of available resources, since taking a resource out of the pool typically takes less time than replenishing that resource.

The aforementioned challenges, among others, are addressed in some embodiments by the disclosed techniques for replenishment-aware management of resource usage and limits. Generally described, one or more aspects of the present application relate to a system for managing the resource limit associated with a user, where the resource limit indicates the amount of compute resources the user is allowed to use (e.g., by executing the user's code thereon), have reserved or running within the cloud provider network on the user's behalf (e.g., for executing the user's code thereon in the future), and/or otherwise have assigned to the user. Such resource limits are used in multi-tenant services to protect the larger pool of resources from being depleted by large requests from a particular user, and can for example be adaptively set on a per-user basis based on a number of factors including historical usage patterns, current resource capacity, and forecasted capacity additions. As the user requests and obtains additional resources from a pool of resources, the user's resource usage is increased to reflect the additional resources being used by the user. As the resources used by the user are released, to ensure that the pool of resources has sufficient capacity to handle additional resource requests, the replenishment status of the pool is further checked, and if the replenishment status satisfies a condition for updating the user's resource usage, the user's resource usage is decreased to reflect the resources that are no longer in use by the user. The released resources are torn down and re-provisioned back into the pool of resources. By updating the resource usage in a replenishment-aware manner (and not relying on a request throttling mechanism to ensure sufficient warm pool capacity), the techniques described herein ensure (or improve the chance of providing) adequate capacity in the warm pool while enabling the customers to freely burst to their resource limits without being throttled.

As will be appreciated by one of skill in the art in light of the present disclosure, the embodiments disclosed herein improve the ability of computing systems, such as container systems, code execution systems, and resource usage management systems, to provide mechanisms for managing resource usage and resource limits in a replenishment-aware fashion on a cloud provider network. By taking the replenishment status of available resources into account, the cloud provider network of the present disclosure can address the deficiencies described above.

Prior techniques generally relied on throttling the rate at which resource requests are received on the frontend. However, such approaches can be overly limiting, and may prevent the users from fully utilizing the resources allotted to them under their respective resource limits (e.g., by bursting to the resource limit without getting throttled). In contrast, embodiments of the present disclosure enable replenishment-aware updating of resource usage levels such that sufficient capacity is provided in the warm pool while still enabling the users to burst to their resource limits without being throttled.

The presently disclosed embodiments therefore address technical problems inherent within computing systems, such as optimizing the use of resource limits. These technical problems are addressed by the various technical solutions described herein, including replenishment-aware management of resource usage and limits. Thus, the present disclosure represents an improvement on existing software execution systems, and computing systems in general.

These and other aspects of the disclosure will now be described with regard to certain examples and embodiments, which are intended to illustrate but not limit the disclosure.

Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

FIG. 1 depicts an example computing environment 100 including a cloud provider network 120 in which the disclosed container service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for managing resource usage and limits may be implemented in non-elastic computing environments as well.

The cloud provider network 120 can be accessed by user computing devices 102 over a network 104. The cloud provider network 120 may include a container service 140 and an instance provisioning service 115 that are in networked communication with one another and with the network 104 to provide users with on-demand access to the services and resources provided by the cloud provider network 120. As used herein, the term "resource," in addition to its ordinary meaning, may refer to a form of compute capacity configurable and/or usable to execute a piece of code specified by a user. For example, a resource may include, but are not limited to, a virtual machine (VM) instance, a bare-metal instance, a microVM, a physical machine, a container, a node, and/or an offload card, which are described in greater detail below. In some embodiments, the term "resource" is used interchangeably with instance or compute capacity.

The container service 140 provides a warm pool replenishment manager 142, a warm pool 143, a resource usage manager 145, and an active pool 146. The warm pool replenishment manager 142 keeps the warm pool 143 replenished so that the warm pool 143 includes compute capacity (e.g., a number of instances) sufficient to handle incoming requests for compute capacity. For example, as instances are removed from the warm pool 143 to handle incoming requests, the warm pool replenishment manager 142 may add additional instances (e.g., those obtained from the instance provisioning service 115) to the warm pool 143. The resource usage manager 145 keeps track of the resource usage and resource limit for each user of the cloud provider network 120. The resource usage of a user may indicate the number of instances currently assigned to the user for handling code executions on the user's behalf, and the resource limit of a user may indicate the maximum number of instances allowed to be assigned to the user. For example, if a user has a resource limit of 30 instances and the user has 30 instances currently executing user code on the user's behalf, a request to obtain an additional instance may be rejected. The techniques for replenishing the warm pool 143 and managing the resource usage and limits associated with a plurality of users of the cloud provider network 120 are described in greater detail below with reference to FIGS. 2-6.

The warm pool 143 is a collection of instances that are ready to be used to handle incoming task launch/execution requests. As shown in FIG. 1, the warm pool 143 includes a sub-pool 143A including instances 144A and a sub-pool 143B including instances 144B. For example, the instances 144A and instances 144B may have different sizes, different configurations, and/or different software components loaded thereon. The container service 140 may receive a request for an instance that can be used to execute a task specified in the request, and identify an instance that can be used to execute the task from the warm pool 143 (e.g., based on one or more configuration parameters specified in the request), and move the identified instance to the active pool 146 to initiate executing the task on behalf of the user of the task.

The active pool 146 is a collection of instances that have each been assigned to a corresponding user for executing a given task on behalf of the user. For example, the user-assigned instance 148 is executing user code 150 on behalf of a user of the cloud provider network 120. Additional details relating to the warm pool 143 and the active pool 146 are provided, for example, in U.S. application Ser. No. 14/977,524 (U.S. Pat. No. 10,067,801; issued Sep. 4, 2018), titled "ACQUISITION AND MAINTENANCE OF COMPUTE CAPACITY," which is incorporated herein by reference in its entirety.

The user code 150 may refer to one or more programs, applications, tasks, container images, routines, subroutines, threads, processes, modules, etc. written in a specific program language. Such user code may be executed to achieve a specific task, for example, in connection with a particular web application or mobile application developed by the user. For example, the user code may be written in JavaScript (node.js), Java, Python, Ruby, and/or any other programming language.

The instance provisioning service 115 provides instances 116 that can be used by the container service 140 to perform one or more of the techniques described herein. For example, the container service 140 may use the instance provisioning service 115 to provide the instances in the warm pool 143 and the active pool 146). The instance provisioning service 115 may provide resizable computing capacity (e.g., instances 116) to the container service 104 or users of the cloud provider network 120 for building and hosting their software systems. The instance provisioning service 115 and associated control plane functionality can provide an elastic compute cloud service of the cloud provider network 120. Compute resources can be provided from the instance provisioning service 115 to the container service 140 (or directly to users of the cloud provider network 120) via an elastic compute cloud service (referred to in various implementations as an elastic compute service, a virtual machines service, a computing cloud service, a compute engine, or a cloud compute service). The container service 140 can use the instance provisioning service 115 to launch as many virtual or physical computing environments, referred to as "instances," as they need. The instances can have various configurations of processing power, memory, storage, and networking capacity depending upon user needs. The instance provisioning service 115 can also include computer storage for temporary data used while an instance is running; however, as soon as the instance is shut down this data is lost.

The instance provisioning service 115 may provide the instances shown in FIG. 1 with varying computational and/or memory resources. In one embodiment, each of the instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Different instance families may be divided into different sub-pools as shown in FIG. 1. The instances shown in FIG. 1 may include one or more of physical machines, virtual machines, containers, nodes, or other forms of virtual or physical compute units that are configured to execute one or more applications, or any combination thereof.

In some implementations, at least a subset of virtualization management tasks may be performed at one or more offloading cards so as to enable more of the processing capacity of the host to be dedicated to client-requested compute instances e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning an instance generally includes reserving resources (e.g., computational and memory resources) of an underlying physical machine (e.g., from a pool of available physical machines and other resources), installing or launching required software (e.g., an operating system), and making the instance available to a user for performing tasks specified by the client (e.g., by adding the instance to the warm pool 143). After an instance is done being used (also referred to herein as being released) by the user, the instance can be torn down and re-provisioned back into the warm pool 143 for subsequent use by the user or another user of the cloud provider network 120.

Although some embodiments of the present disclosure are described with reference to the instances that are part of the cloud provider network 120, in other embodiments, the techniques described herein are applied to one or more instances that are outside the cloud provider network 120 (e.g., implemented using the user computing devices 102 and/or other on-premises computing resources of the users of the cloud provider network 120). Although not shown in FIG. 1, one or more of the instances shown in FIG. 1 may be part of one or more computing "clusters," which can include at least one cluster master (which runs control processes including scheduling, resource control, handling API requests, and deciding what runs on the cluster's nodes) and multiple nodes (e.g., compute instances that can run containerized applications and other workloads). These clusters can run across a number of physical machines in a distributed computing environment such as the cloud provider network 120.

The container service 140 may provide a set of application programming interfaces ("APIs") that can be used by the users of the user computing devices 102 to request compute resources and execute user code (e.g., tasks, program codes, container images, etc.) on the requested compute resources. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network 120, enabling the development of applications that interact with resources and services hosted in the cloud provider network 120. APIs can also enable different services of the cloud provider network 120 to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include compute servers, object storage servers, block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for managing resource usage and limits can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120. A pool of instances, as described herein (e.g., warm pool 143 or active pool 146), may include a single type of such instances, or a combination of two or more types of such instances.

Example Workflow for Updating Resource Usage

Figure 2:
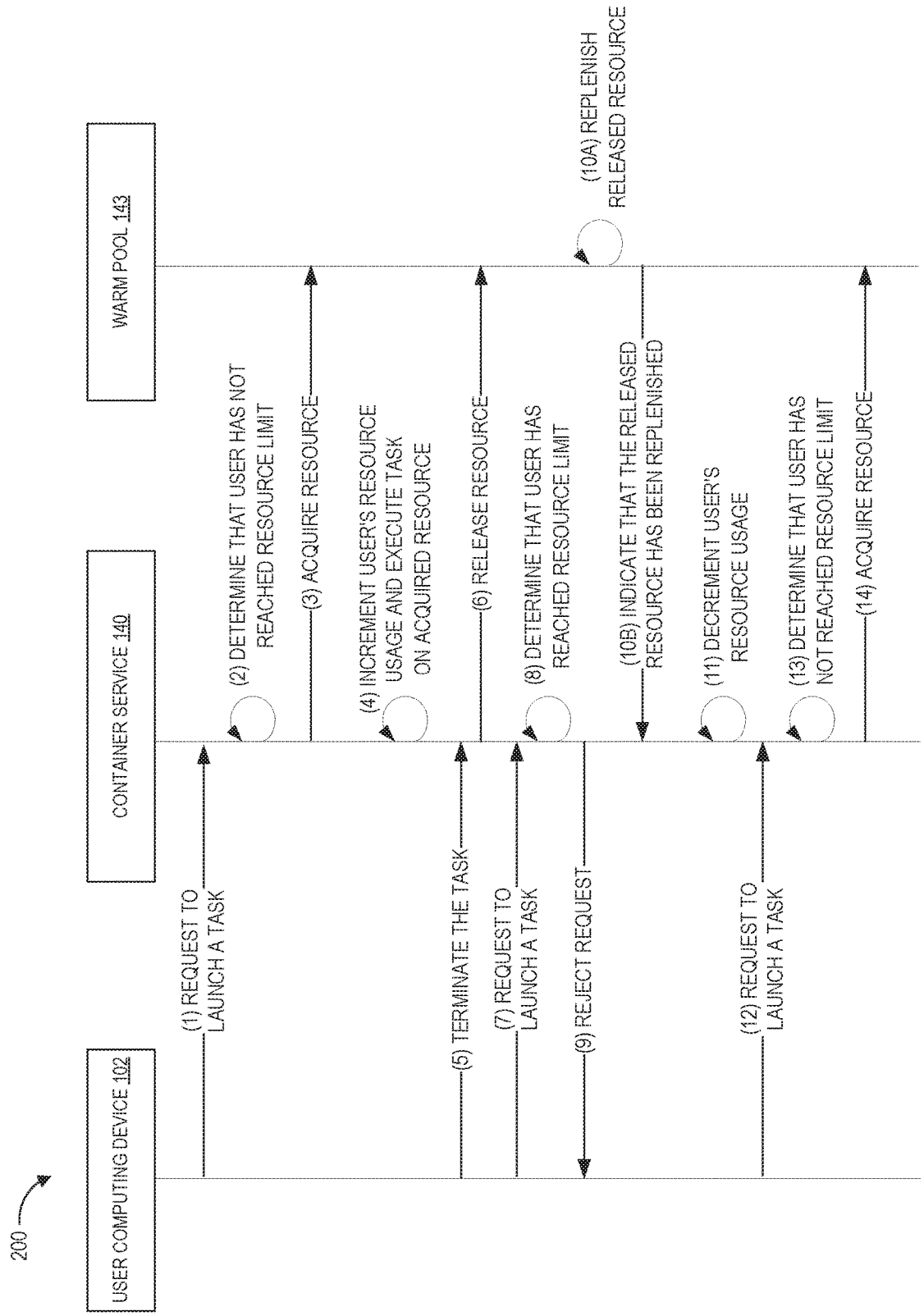
FIG. 2 depicts a workflow diagram illustrating the interactions between the various components of FIG. 1 in accordance with aspects of the present disclosure.

FIG. 2 depicts a workflow diagram 200 illustrating the interactions between the various components of FIG. 1 for updating the resource usage of a user in accordance with aspects of the present disclosure. As shown in FIG. 2, at (1), the user computing device 102 submits a request to launch a task to the container service 140, for example, via a console user interface or a command line interface provided by the container service 140. The request may indicate an identifier associated with each user code (e.g., container image) that the user wishes to execute on the container service 140 and one or more configuration parameters usable to define the execution environment in which the user code should be executed (e.g., resource allocation, networking configuration, etc.). At (2), the container service 140 determines that the user has not reached the user's resource limit. At (3), the container service 140 acquires the requested resource from the warm pool 143. At (4), the container service 140 executes the task using the acquired resource and increments the user's resource usage to reflect the user's usage of the resource acquired from the warm pool 143.

At (5), the user computing device 102 causes the task executing on the resource to be terminated, and in response, at (6), the container service 140 releases the resource. At (7), the user computing device 102 submits another request to launch another task. At (8), the container service 140 determines that the user has reached the user's resource limit, and at (9), rejects the request. Subsequent to rejecting the request, at (10A), the warm pool 143 is replenished so that the resource released at (6) is replaced with another resource, and at (10B), an indication is provided to the container service 140 that the released resource has been replaced in the warm pool 143. In response, the container service 140 decrements the user's resource usage to reflect the release of the resource. For example, the container service 140 may check the replenishment status of the warm pool 143 (e.g., periodically or in response to determining that the resource was released or the task executing on the resource was terminated/failed to execute), and if the replenishment status indicates that the warm pool 143 is sufficiently replenished (e.g., sufficient to handle expected incoming traffic, or such that at least the resource removed from the warm pool 143 at (3) has been replaced with another resource), the container service 140 may update the user's resource usage to no longer include the released resource.

At (12), the user computing device 102 submits yet another request to launch another task. At (13), the container service 140 determines that the user has not reached the user's resource limit and, at (14), acquires the resource requested in the request received at (12).

As illustrated, by taking the replenishment status of the warm pool 143 into account when updating the user's resource usage, the container service 140 ensures (or increases the likelihood) that the warm pool 143 will be able to handle future requests from the user (or other users). By doing so, the outcome of updating the user's resource usage prematurely and not being able to satisfy additional requests from the user due to the warm pool 143 not having enough available compute capacity can be avoided.

Figure 3:
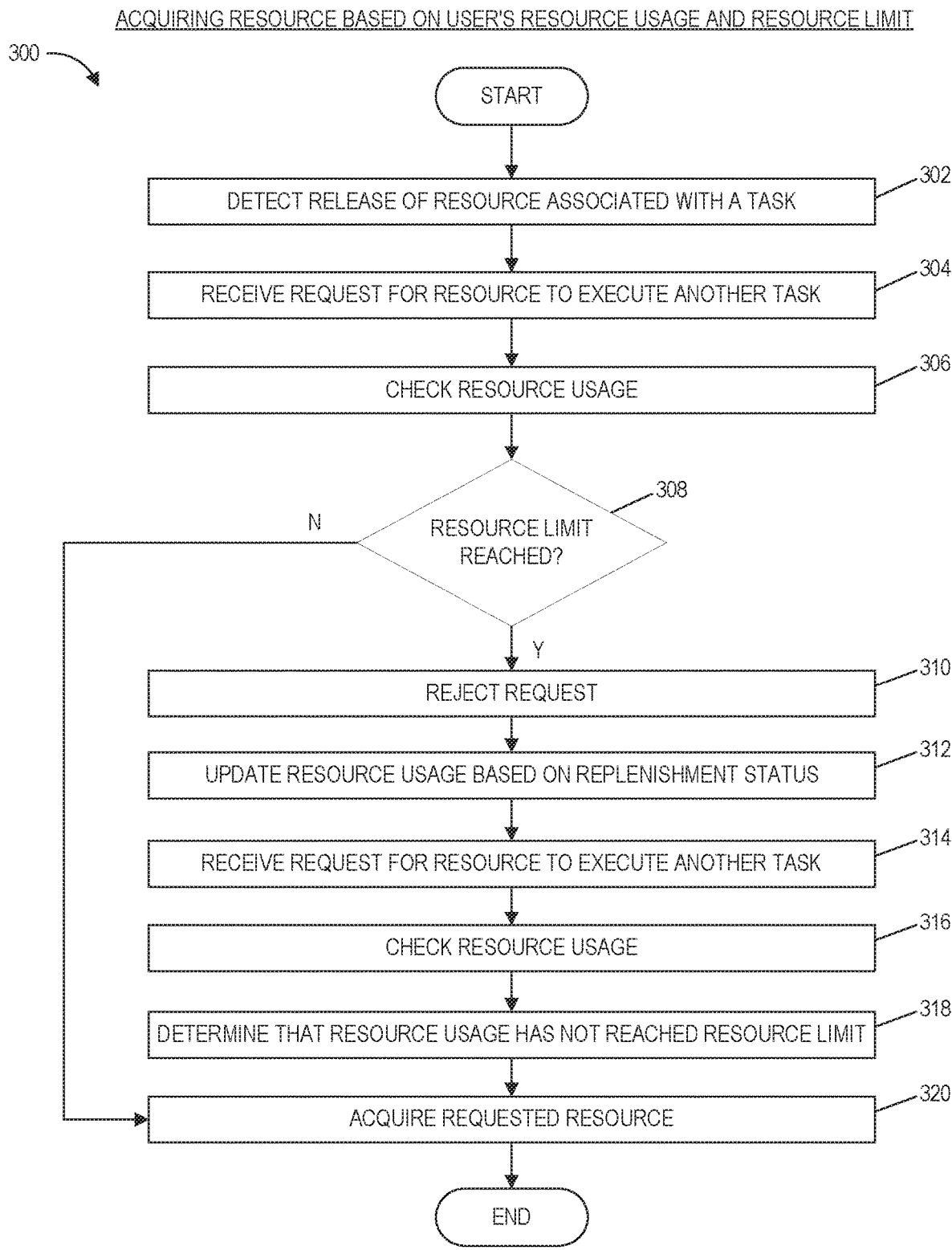
FIG. 3 is a flowchart of an example process for acquiring resources based on the user's resource usage and resource limit in accordance with aspects of the present disclosure.

Example Routine for Acquiring Resources based on Resource Usage and Resource Limit FIG. 3 depicts an illustrative routine 300 for acquiring resources based on the user's resource usage and resource limit in accordance with aspects of the present disclosure. The routine 300 may be carried out, for example, by the container service 140 (or a component thereof such as the warm pool replenishment manager 142 and/or the resource usage manager 145) or one or more other components of the cloud provider network 120 described herein. For convenience, some or all of the steps of the routine 300 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the container service 140 detects the release of a resource (e.g., an instance described with reference to FIG. 1) associated with a task. For example, the resource may have been assigned to a user for executing the task on behalf of the user, and the resource may have been released due to the user instructing the task to terminate, or the task failing to execute or being terminated on its own.

At block 304, the container service 140 receives a request for resource to execute another task. For example, the user, now that she is done with the resource released at block 302, may be sending another request for a resource that can be used to execute another task on her behalf.

At block 306, the container service 140 checks the user's resource usage, and at block 308, the container service 140 determines whether the user's resource usage has reached or is at the resource limit associated with the user. If the container service 140 determines that the user's usage has not reached the user's resource limit, the routine 300 proceeds to block 320, at which the resource requested at block 304 is acquired to be assigned to the requesting user. Otherwise, the routine 300 proceeds to block 310.

At block 310, the container service 140 rejects the resource request due to the user's resource usage being at the user's resource limit. The container service 140 may send a notification to the user that the request has been rejected due to the user reaching the resource limit (e.g., despite, and subsequent to, the user having released one of the resources acquired from the container service 140).

At block 312, subsequent to rejecting the request at block 310, the container service 140 updates the user's resource usage based on the replenishment status of the warm pool 143. For example, the replenishment status may indicate whether a threshold amount of resources (e.g., compute instances) removed from the warm pool 143 has been replaced. In such an example, the container service 140 may determine that at least the threshold amount of resources that were removed from the warm pool 143 has been replaced with additional resources, and based on that determination, reduce the user's resource usage to reflect the release of the resource at block 302. As another example, the replenishment status may indicate whether the released resource at block 302 has been replaced in the warm pool 143 subsequent to removing the resource from the warm pool 143 for executing the task on behalf of the user. In such an example, the container service 140 may determine that the resource released at block 302 has already been replaced in the warm pool 143 with another resource, and based on that determination, reduce the user's resource usage to reflect the release of the resource at block 302.

At block 314, the container service 140 receives another request for resource to execute another task on behalf of the user. In response, at block 316, the container service 140 checks the user's resource usage, and at block 318, the container service 140 determines that the user's resource usage has not reached or is not at the resource limit associated with the user. At block 320, the container service 140 acquires the resource requested at block 314, and the routine 300 may then end.

As illustrated in FIG. 3, when a user's resource usage has reached the user's resource limit, an additional resource request received after one of the compute resources assigned to the user is released but before the release of the compute resource is reflected in the user's resource usage (e.g., by decrementing the number of compute resources assigned to the user by one) may be rejected due to the user's resource usage still being at the user's resource limit.

The routine 300 can include fewer, more, or different blocks than those illustrated in FIG. 3 and/or one or more blocks illustrated in FIG. 3 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Figure 4:
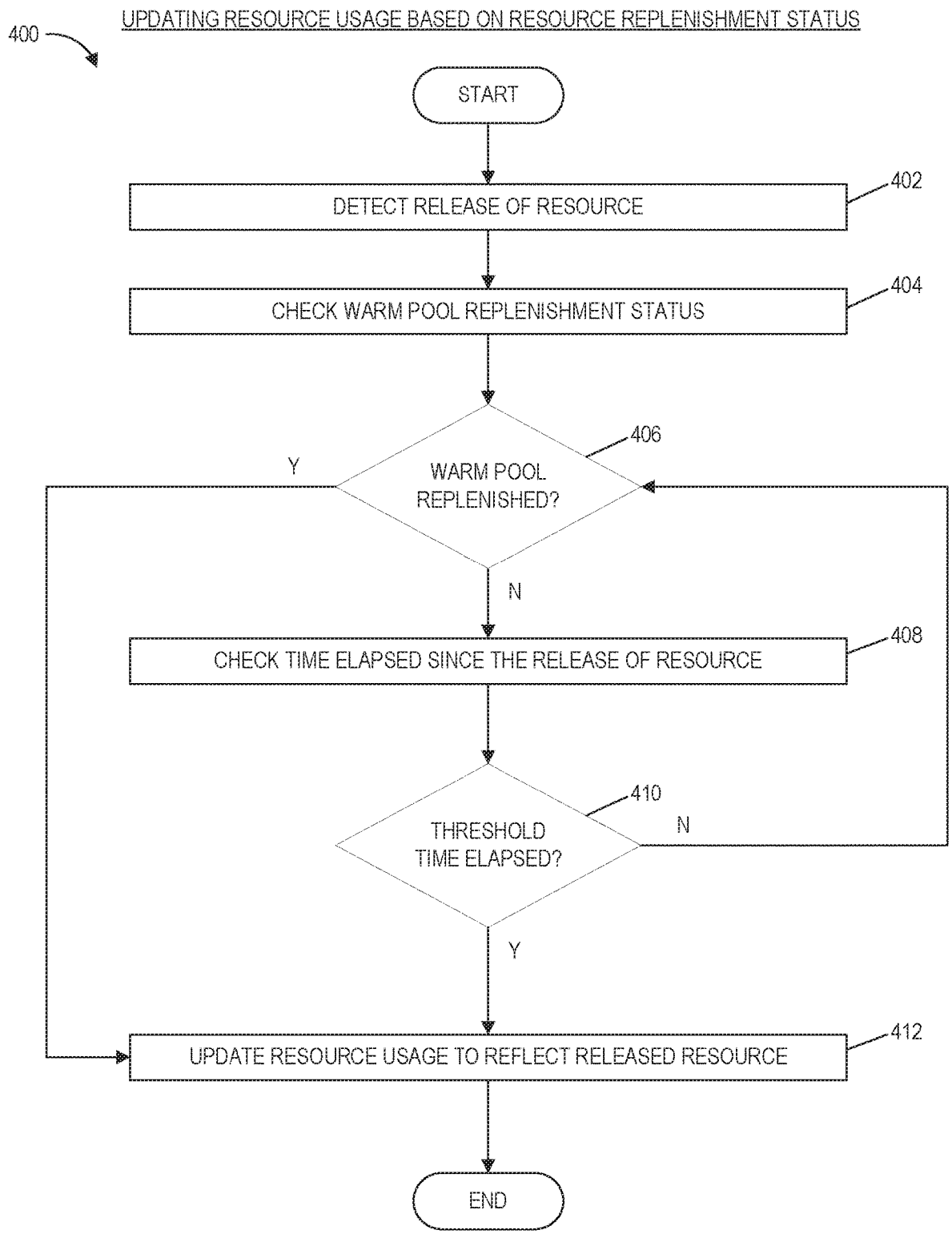
FIG. 4 is a flowchart of an example process for updating the resource usage based on the resource replenishment status in accordance with aspects of the present disclosure.

Example Routine for Updating Resource Usage based on Resource Replenishment Status FIG. 4 depicts an illustrative routine 400 for updating the resource usage based on the resource replenishment status in accordance with aspects of the present disclosure. The routine 400 may be carried out, for example, by the container service 140 (or a component thereof such as the warm pool replenishment manager 142 and/or the resource usage manager 145) or one or more other components of the cloud provider network 120 described herein. For convenience, some or all of the steps of the routine 400 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the container service 140 detects the release of a resource (e.g., an instance described with reference to FIG. 1) associated with a task. For example, the resource may have been assigned to a user for executing the task on behalf of the user, and the resource may have been released due to the user instructing the task to terminate, or the task failing to execute or being terminated on its own.

At block 404, the container service 140 checks the warm pool replenishment status. For example, the replenishment status may indicate whether a threshold amount of resources (e.g., compute instances) removed from the warm pool 143 has been replaced. As another example, the replenishment status may indicate whether the released resource at block 302 has been replaced in the warm pool 143 subsequent to removing the resource from the warm pool 143 for executing the task on behalf of the user. As yet another example, the replenishment status may indicate whether one or more of the resources assigned to the user have been replaced in the warm pool 143 (e.g., the resource released at block 402 or another resource that is still executing a task on behalf of the user). For example, the warm pool 143 may be associated with one flag indicating whether a threshold amount of resources (e.g., compute instances) removed from the warm pool 143 has been replaced, and the user may be associated with another flag indicating whether one or more of the user's resources have been replaced in the warm pool 143. If the container service 140 determines that the warm pool is sufficiently replenished at block 406 (e.g., based on the indication provided by the replenishment status that a threshold amount of resources has been replaced, the released resource has been replaced, and/or one or more resources assigned to the user have been replaced), the routine 400 proceeds to block 412, at which the container service 140 updates the user's resource usage to reflect the released resource. Otherwise, the container service 140 proceeds to block 408.

At block 408, the container service 140 checks the amount of time elapsed since the release of the resource. At block 410, if the container service 140 determines that the amount of time elapsed is greater than or equal to a threshold amount of time, the routine 400 proceeds to block 412. Otherwise, the routine 400 proceeds to block 406, at which the container service 140 determines again whether the warm pool is sufficiently replenished. The blocks 406-410 may repeat until one of the conditions at block 406 and block 410 is satisfied, at which point the routine 400 would proceed to block 412. The routine 400 may then end.

The routine 400 can include fewer, more, or different blocks than those illustrated in FIG. 4 and/or one or more blocks illustrated in FIG. 4 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Rejecting Resource Request based on Released Resource

Figure 5:
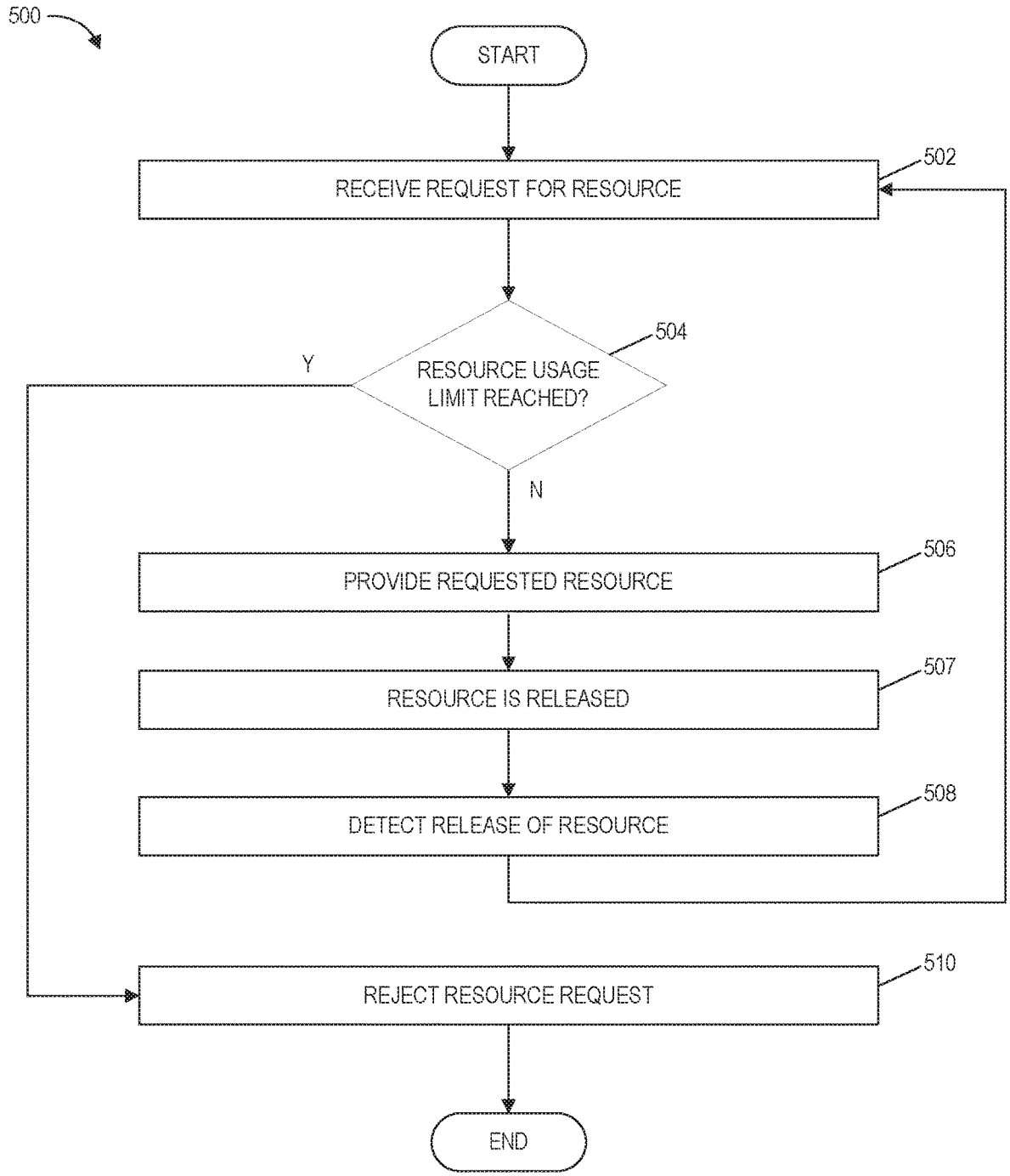
FIG. 5 is a flowchart of an example process for rejecting a resource request based on released resource being unreplenished in accordance with aspects of the present disclosure.

FIG. 5 depicts an illustrative routine 500 for rejecting a resource request based on released resource being unreplenished in accordance with aspects of the present disclosure. The routine 500 may be carried out, for example, by the container service 140 (or a component thereof such as the warm pool replenishment manager 142 and/or the resource usage manager 145) or one or more other components of the cloud provider network 120 described herein. For convenience, some or all of the steps of the routine 500 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the container service 140 receives a request for resource to execute a task on behalf of a user.

At block 504, the container service 140 determines whether the user's resource usage has reached or is at the user's resource limit. If the container service 140 determines that the user's resource usage has reached or is at the user's resource limit, the routine 500 proceeds to block 510, at which the container service 140 rejects the resource request. Otherwise, the routine 500 proceeds to block 506.

At block 506, the container service 140 provides the requested resource. The resource provided by the container service 104 may then be used to execute user code thereon. For example, the user code may be a task including several container images, and the execution of the container images may be initiated on the provided resource.

At block 507, the resource is released subsequent to the provision of the resource at block 506. The resource may be released at the request of the user to whom the resource has been assigned. For example, the user may send, from the user computing device 102 to the container service 140, a request to terminate the task executing on the resource, and in response, the container service 140 may terminate the task and cause the resource to be released. Alternatively, the resource may be released due to an error or failure (e.g., in the user code or in the underlying infrastructure implementing the resource) that prevents the task from executing or causes the execution of the task to prematurely end. In yet another case, the resource may be released when the task finishes executing.

At block 508, the container service 140 detects the release of the resource. The routine 500 then proceeds to block 502, at which another resources is request is received for the same user. The routine 500 may continue to cycle through blocks 502-508 until the container service 140 determines at block 504 that the user's resource usage has reached or is at the user's resource limit, at which point the routine 500 would proceed to block 510. For example, if a task fails to launch, the underlying resource used may be released, and the user may continue to retry the task execution (e.g., quickly enough that the warm pool may not have a chance to fully replenish itself) until the user's resource usage reaches the user's resource limit. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Replenishing Resources in Warm Pool

Figure 6:
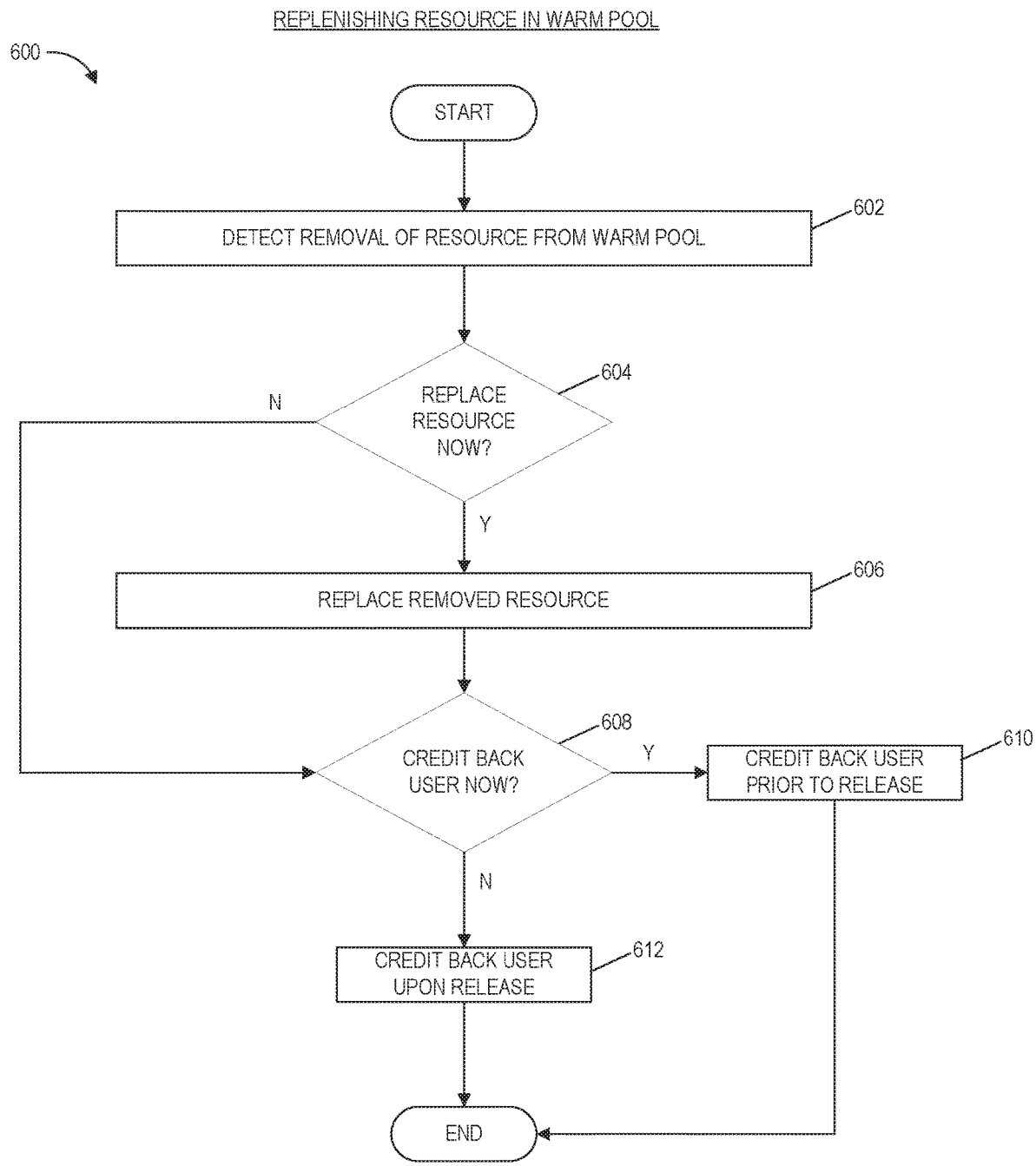
FIG. 6 is a flowchart of an example process for replenishing resources in a warm pool in accordance with aspects of the present disclosure.

FIG. 6 depicts an illustrative routine 600 for replenishing resources in the warm pool in accordance with aspects of the present disclosure. The routine 600 may be carried out, for example, by the container service 140 (or a component thereof such as the warm pool replenishment manager 142 and/or the resource usage manager 145) or one or more other components of the cloud provider network 120 described herein. For convenience, some or all of the steps of the routine 600 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the container service 140 detects removal of a resource from the warm pool 143. For example, the container service 140 may remove an instance from the warm pool 143 (e.g., into the active pool 146) to execute a task on the resource on behalf of a user of the cloud provider network 120.

At block 604, the container service 140 determines whether the removed resource should be replaced now (e.g., rather than later when the user is done using the removed resource and the resource is released). This determination may depend on one of several factors. For example, the container service 140 may determine that the removed resource should be replaced now if the available capacity in the warm pool 143 below a threshold level. In such a case, the container service 140 may replace the removed resource right away (e.g., without waiting for the resource to be released/discarded by the user requesting the resource). On the other hand, if the available capacity in the warm pool 143 is above the threshold level, the container service 140 may determine that the removed resource does not need to be replaced now, and may wait until the resource is released/discarded before replacing the resource in the warm pool 143. If the container service 140 determines that the removed resource should be replaced now, the routine 600 proceeds to block 606. Otherwise, the routine 600 proceeds to block 608.

At block 606, the container service 140 replaces the removed resource (e.g., by adding a new resource to the warm pool 143 from the instance provisioning service 115). For example, the container service 140 may add the new resource to the same sub-pool from which the resource was removed at block 602. The new resource may be an instance that has the same (or similar) instance type and/or instance size (e.g., CPU, memory, disk, networking, etc.).

At block 608, the container service 140 determines whether the user to whom the removed resource was assigned should be credited back now (e.g., rather than later when the user has released the resource). For example, if the warming pool 143 has at least a threshold amount of available resources (e.g., in view of expected demands in the near future), the container service 140 may determine that the user can be credited back right away without having to wait until the resource is released, effectively increasing the user's resource limit for a time period. By doing so, the container service 140 would prevent a subsequent request from the user from being rejected, if there is enough available capacity in the warm pool 143 to handle incoming resource requests. For example, if the subsequent request were received before or immediately after the release of one of the user's resources, the container service 140 may not have had enough time to update the user's resource usage to reflect the released resource. Even in such cases, crediting the user back right away after removing the resource (e.g., without waiting for the resource to be released) allows such a request to be granted. On the other hand, if the warming pool 143 does not have at least a threshold amount of available resources (e.g., in view of expected demands in the near future), the container service 140 may determine that the user should be credited back after the removed resource is eventually released.

In some embodiments, the container service 140 takes into account the resource usage patterns of the user in determining whether the user should be credited back now.

For example, if the user has been repeatedly requesting and releasing the resources at a high rate (e.g., above a certain threshold level, which may in some cases be an indication of repeated retries of a task that is failing to launch) or has an average lease time (e.g., the amount of time elapsed between the resource being assigned to the user and the resource being released) that is below a threshold level, the container service 140 may determine that the user should be credited back when one of the resources assigned to the user is released (e.g., to prevent the user from churning through all of the available resources in the warm pool 143 before the warm pool 143 can be replenished and causing the warm pool 143 to be depleted). On the other hand, if the user has been holding onto the resources assigned to the user for quite some time and the rate at which the user has been requesting and releasing resources is below a threshold level (or has an average lease time that is above a threshold level), the container service 140 may determine that the user can be credited back now without waiting for any one of the resources assigned to the user to be released.

If the container service 140 determines that the user should be credited back now, the routine 600 proceeds to block 610, at which the container service 140 credits back the user (e.g., by decrementing the user's resource usage by one, which would allow the user to withdraw another resource from the warm pool 143) prior to the release of the resource removed at block 602 (or another resource that was assigned to the user). Otherwise, the routine 600 proceeds to block 612, at which the container service 140 credits back the user in response to the release of the resource removed at block 602 (or another resource that was assigned to the user). For example, the container service 140 may detect the release of the resource that was removed at block 602, determine the sub-pool associated with the released resource (e.g., the sub-pool from which the resource was originally removed), and replenish the sub-pool determined to be associated with the released resource. For example, the resource replacing the released resource may be identical or substantially similar to the released resource in size, capacity, configuration, and/or pre-loaded software components. The routine 600 may then end.

The routine 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Service

Figure 7:
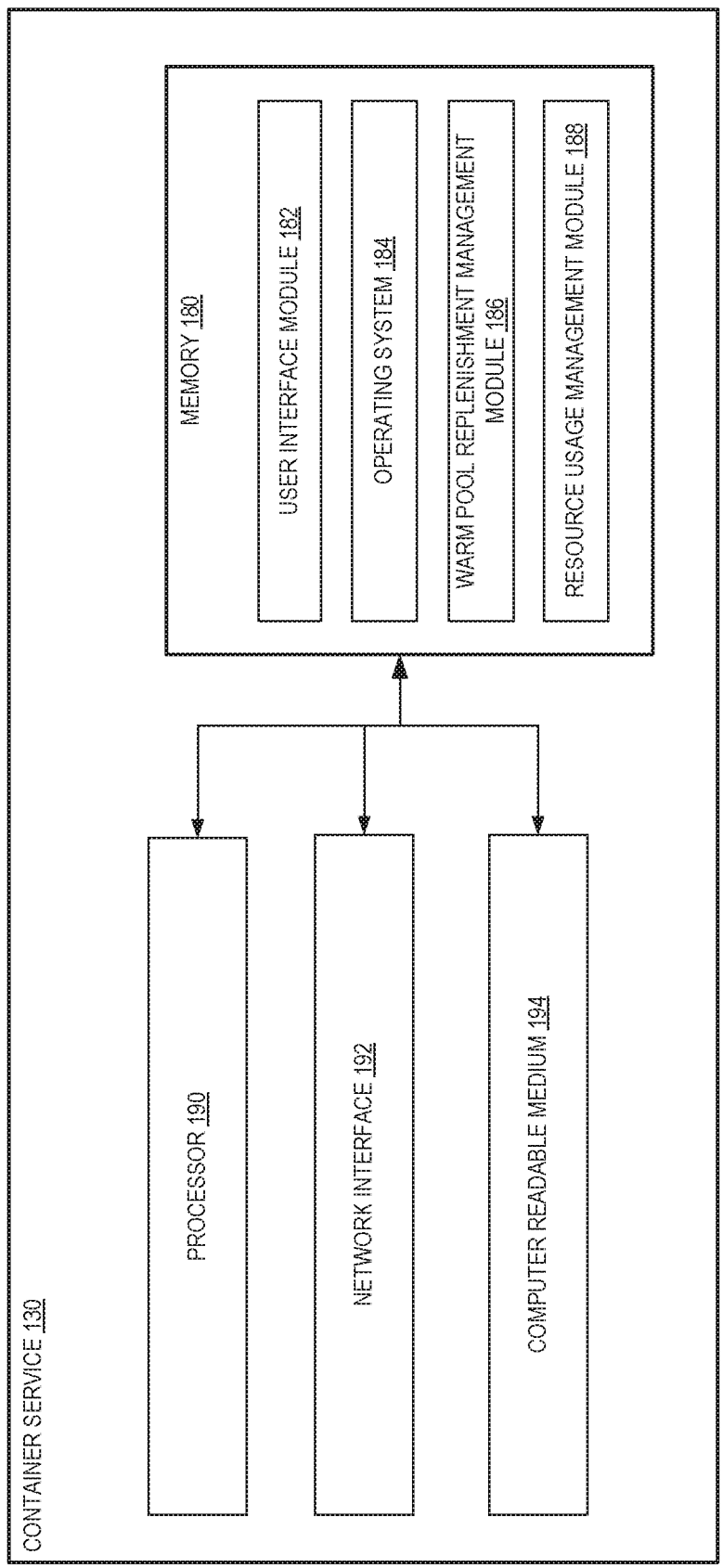
FIG. 7 depicts a general architecture of a computing device or system providing a container service in accordance with aspects of the present disclosure.

FIG. 7 depicts an example architecture of a computing system (referred to as the container service 140) that can be used to perform one or more of the techniques described herein or illustrated in FIGS. 1-6. The general architecture of the container service 140 depicted in FIG. 7 includes an arrangement of computer hardware and software modules that may be used to implement one or more aspects of the present disclosure. The container service 140 may include many more (or fewer) elements than those shown in FIG. 7. It is not necessary, however, that all of these elements be shown in order to provide an enabling disclosure. As illustrated, the container service 140 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the container service 140. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include a warm pool replenishment management module 186 and a resource usage management module 188 that may be executed by the processor 190. In one embodiment, the warm pool replenishment management module 186 and/or the resource usage management module 188 implement various aspects of the present disclosure, e.g., those illustrated in FIGS. 1-6 or described with reference to FIGS. 1-6.

While the warm pool replenishment management module 186 and the resource usage management module 188 are shown in FIG. 7 as part of the container service 140, in other embodiments, all or a portion of the warm pool replenishment management module 186 and/or the resource usage management module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the container service 140. It will also be appreciated that, in some embodiments, a user computing device (e.g., the user computing device 102 of FIG. 1) may implement functionality that is otherwise described herein as being implemented by the elements and/or modules of the container service 140. For example, the user computing device 102 may receive code modules or other instructions from the container service 140 and/or other components of the cloud provider network 120 via the network 104 that are executed by the user computing device 102 to implement various aspects of the present disclosure.

Although a single processor, a single network interface, a single computer-readable medium, and a single memory are illustrated in the example of FIG. 7, in other implementations, the container service 140 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a warm pool of virtual machines, wherein each virtual machine in the warm pool is usable to execute a task in response to an incoming request to execute the task; and a container service comprising computer hardware, wherein the container service is configured to manage and utilize the warm pool of virtual machines and is further configured to at least: receive a first request to acquire a virtual machine from the warm pool of virtual machines and execute a first task on the virtual machine on behalf of a user, wherein the first request specifies a first set of configuration parameters usable to execute the first task; determine that a resource usage associated with the user is within a resource limit associated with the user, wherein the resource usage indicates a number of virtual machines currently assigned to the user for executing tasks on behalf of the user, and wherein the resource limit indicates a maximum number of virtual machines that is allowed to be assigned to the user at any given moment; assign, based at least on the first set of configuration parameters, a first virtual machine from the warm pool of virtual machines to the user for executing the first task thereon, wherein the first virtual machine is implemented using first physical computing resources; update the resource usage associated with the user such that the resource usage includes the first virtual machine assigned to the user; determine that the first virtual machine has been released due to the first task failing to execute; receive a second request to execute a second task on behalf of the user, wherein the second request specifies a second set of configuration parameters usable to execute the second task; and reject the second request based at least in part on a determination that the resource usage associated with the user satisfies the resource limit associated with the user, wherein the resource usage associated with the user still includes the first virtual machine that has been released.

EI 2: The cloud provider system of any preceding EI or any combination of the preceding EIs, wherein the container service is further configured to at least: in response to determining that the first virtual machine has been released, replenish the warm pool with a second virtual machine implemented using at least some of the first physical computing resources previously used to implement the first virtual machine; update the resource usage associated with the user such that the resource usage no longer includes the first virtual machine that has been released; receive a third request to execute a third task on behalf of the user, wherein the third request specifies a third set of configuration parameters usable to execute the third task; determine that the resource usage associated with the user is within the resource limit; assign, based at least on the third set of configuration parameters, a third virtual machine from the warm pool of virtual machines to the user for executing the third task thereon; and update the resource usage associated with the user such that the resource usage includes the third virtual machine assigned to the user.

EI 3: The cloud provider system of any preceding EI or any combination of the preceding EIs, wherein the first set of configuration parameters, the second set of configuration parameters, and the third set of configuration parameters are identical to each other.

EI 4: The cloud provider system of any preceding EI or any combination of the preceding EIs, wherein the first virtual machine and the second virtual machine are both associated with the same amount of computing resources and have the same operating system installed thereon.

EI 5: A computer-implemented method comprising: providing a pool of compute instances, wherein each compute instance in the pool is usable to execute a task on behalf of one of a plurality of users, wherein each user of the plurality of users is associated with a resource usage indicating a number of compute instances currently assigned to the user and a resource limit indicating a maximum number of compute instances allowed to be assigned to the user; determining that a first compute instance that is assigned to execute a first task on behalf of a first user of the plurality of users has been released; in response to determining that the first compute instance has been released, determining a replenishment status of the pool of compute instances; determining that the replenishment status satisfies a condition for updating the resource usage associated with the first user to reflect the first compute instance being released; and updating the resource usage associated with the first user to reflect the first compute instance being released, wherein, subsequent to updating the resource usage, the resource usage does not include the first compute instance.

EI 6: The computer-implemented method of any preceding EI or any combination of the preceding EIs, wherein the replenishment status of the pool of compute instances indicates that a threshold amount of compute instances removed from the pool of compute instances has been replaced.

EI 7: The computer-implemented method of any preceding EI or any combination of the preceding EIs, wherein the replenishment status of the pool of compute instances indicates that the first compute instance has been replaced in the pool subsequent to removing the first compute instance from the pool for executing the first task on behalf of the first user.

EI 8: The computer-implemented method of any preceding EI or any combination of the preceding EIs, further comprising: receiving a request to execute a second task on behalf of the first user on a compute instance selected from the pool of compute instances; and prior to updating the resource usage associated with the first user to reflect the first compute instance being released, rejecting the request based at least in part on the resource usage associated with the first user satisfying the resource limit associated with the first user.

EI 9: The computer-implemented method of any preceding EI or any combination of the preceding EIs, further comprising: receiving a request to execute a second task on behalf of the first user on a compute instance selected from the pool of compute instances; and subsequent to updating the resource usage associated with the first user to reflect the first compute instance being released, assigning, based at least in part on the resource usage associated with the first user not satisfying the resource limit associated with the first user, a second compute instance from the pool of compute instances to the first user for executing the second task thereon.

EI 10: The computer-implemented method of any preceding EI or any combination of the preceding EIs, further comprising, before the second compute instance is released, updating, based at least in part on the replenishment status of the pool of compute instances, the resource usage associated with the first user to allow an additional compute instance to be assigned to the first user.

EI 11: The computer-implemented method of any preceding EI or any combination of the preceding EIs, further comprising: determining that a second compute instance that is assigned to execute a second task on behalf of the first user has been released; determining that the replenishment status does not satisfy a condition for updating the resource usage associated with the first user to reflect the second compute instance being released; and subsequent to determining that the second compute instance has been torn down and added back to the pool of compute instances, updating the resource usage associated with the first user to reflect the second compute instance being released, wherein, subsequent to updating the resource usage, the resource usage does not include the second compute instance.

EI 12: The computer-implemented method of any preceding EI or any combination of the preceding EIs, further comprising: determining that a second compute instance that is assigned to execute a second task on behalf of the first user has been released due to the second task failing to execute or being terminated; determining that the replenishment status does not satisfy a condition for updating the resource usage associated with the first user to reflect the second compute instance being released; and subsequent to determining that a predetermined amount of time has passed since the second compute instance being released, updating the resource usage associated with the first user to reflect the second compute instance being released, wherein, subsequent to updating the resource usage, the resource usage does not include the second compute instance.

EI 13: A non-transitory computer-readable medium storing instructions that, when executed by a computing system, cause the computing system to at least: provide a pool of compute instances, wherein each compute instance in the pool is usable to execute a task on behalf of one of a plurality of users, wherein each user of the plurality of users is associated with a resource usage indicating a number of compute instances currently assigned to the user and a resource limit indicating a maximum number of compute instances allowed to be assigned to the user; determine that a first compute instance that is assigned to execute a first task on behalf of a first user of the plurality of users has been released; in response to determining that the first compute instance has been released, determine a replenishment status of the pool of compute instances; determine that the replenishment status satisfies a condition for updating the resource usage associated with the first user to reflect the first compute instance being released; and update the resource usage associated with the first user to reflect the first compute instance being released, wherein, subsequent to updating the resource usage, the resource usage does not include the first compute instance.

EI 14: The non-transitory computer-readable medium of any preceding EI or any combination of the preceding EIs, wherein the replenishment status of the pool of compute instances indicates that a threshold amount of compute instances removed from the pool of compute instances has been replaced.

EI 15: The non-transitory computer-readable medium of any preceding EI or any combination of the preceding EIs, wherein the replenishment status of the pool of compute instances indicates that the first compute instance has been replaced in the pool subsequent to removing the first compute instance from the pool for executing the first task on behalf of the first user.

EI 16: The non-transitory computer-readable medium of any preceding EI or any combination of the preceding EIs, storing further instructions that, when executed by the computing system, cause the computing system to at least: receive a request to execute a second task on behalf of the first user on a compute instance selected from the pool of compute instances; and prior to updating the resource usage associated with the first user to reflect the first compute instance being released, reject the request based at least in part on the resource usage associated with the first user satisfying the resource limit associated with the first user.

EI 17: The non-transitory computer-readable medium of any preceding EI or any combination of the preceding EIs, storing further instructions that, when executed by the computing system, cause the computing system to at least: receive a request to execute a second task on behalf of the first user on a compute instance selected from the pool of compute instances; and subsequent to updating the resource usage associated with the first user to reflect the first compute instance being released, assign, based at least in part on the resource usage associated with the first user not satisfying the resource limit associated with the first user, a second compute instance from the pool of compute instances to the first user for executing the second task thereon.

EI 18: The non-transitory computer-readable medium of any preceding EI or any combination of the preceding EIs, storing further instructions that, when executed by the computing system, cause the computing system to at least: determine that a second compute instance that is assigned to execute a second task on behalf of the first user has been released; determine that the replenishment status does not satisfy a condition for updating the resource usage associated with the first user to reflect the second compute instance being released; and subsequent to determining that the second compute instance has been torn down and added back to the pool of compute instances, update the resource usage associated with the first user to reflect the second compute instance being released, wherein, subsequent to updating the resource usage, the resource usage does not include the second compute instance.

EI 19: The non-transitory computer-readable medium of any preceding EI or any combination of the preceding EIs, storing further instructions that, when executed by the computing system, cause the computing system to at least: determine that a second compute instance that is assigned to execute a second task on behalf of the first user has been released; determine that the replenishment status does not satisfy a condition for updating the resource usage associated with the first user to reflect the second compute instance being released; and subsequent to determining that a predetermined amount of time has passed since the second compute instance being released, update the resource usage associated with the first user to reflect the second compute instance being released, wherein, subsequent to updating the resource usage, the resource usage does not include the second compute instance.

EI 20: The non-transitory computer-readable medium of any preceding EI or any combination of the preceding EIs, wherein the pool of compute instances includes one or more of a virtual machine instance, a bare-metal instance, a physical machine, a container, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a warm pool of virtual machines, wherein each virtual machine in the warm pool is usable to execute a task in response to an incoming request to execute the task; and
   a container service comprising computer hardware, wherein the container service is configured to manage and utilize the warm pool of virtual machines and is further configured to at least:
     receive a first request to acquire a virtual machine from the warm pool of virtual machines and execute a first task on the virtual machine on behalf of a user, wherein the first request specifies a first set of configuration parameters usable to execute the first task;
     determine that a resource usage associated with the user is within a resource limit associated with the user, wherein the resource usage indicates a number of virtual machines currently assigned to the user for executing tasks on behalf of the user, and wherein the resource limit indicates a maximum number of virtual machines that is allowed to be assigned to the user at any given moment;
     assign, based at least on the first set of configuration parameters, a first virtual machine from the warm pool of virtual machines to the user for executing the first task thereon, wherein the first virtual machine is implemented using first physical computing resources;
     update the resource usage associated with the user such that the resource usage includes the first virtual machine assigned to the user;
     determine that the first virtual machine has been released due to the first task failing to execute;
     prior to updating the resource usage associated with the user to reflect the first virtual machine being released, receive a second request to execute a second task on behalf of the user, wherein the second request specifies a second set of configuration parameters usable to execute the second task; and
     reject the second request based at least in part on a determination that a threshold number of virtual machines has not yet been added to the warm pool of virtual machines, wherein the resource usage associated with the user still includes the first virtual machine that has been released.

2. The cloud provider system of claim 1, wherein the container service is further configured to at least:
   in response to determining that the first virtual machine has been released, replenish the warm pool with a second virtual machine implemented using at least some of the first physical computing resources previously used to implement the first virtual machine;
update the resource usage associated with the user such that the resource usage no longer includes the first virtual machine that has been released;
receive a third request to execute a third task on behalf of the user, wherein the third request specifies a third set of configuration parameters usable to execute the third task;
determine that the resource usage associated with the user is within the resource limit;
assign, based at least on the third set of configuration parameters, a third virtual machine from the warm pool of virtual machines to the user for executing the third task thereon; and
update the resource usage associated with the user such that the resource usage includes the third virtual machine assigned to the user.

3. The cloud provider system of claim 2, wherein the first set of configuration parameters, the second set of configuration parameters, and the third set of configuration parameters are identical to each other.

4. The cloud provider system of claim 2, wherein the first virtual machine and the second virtual machine are both associated with the same amount of computing resources and have the same operating system installed thereon.

5. A computer-implemented method comprising:
providing a pool of compute instances, wherein each compute instance in the pool is usable to execute a task on behalf of one of a plurality of users, wherein each user of the plurality of users is associated with a resource usage indicating a number of compute instances currently assigned to the user and a resource limit indicating a maximum number of compute instances allowed to be assigned to the user;
determining that a first compute instance that is assigned to execute a first task on behalf of a first user of the plurality of users has been released;
prior to updating the resource usage associated with the first user to reflect the first compute instance being released, determining that at least a threshold number of compute instances has been added to the pool of compute instances; and
updating the resource usage associated with the first user to reflect the first compute instance being released, wherein, subsequent to updating the resource usage, the resource usage associated with the first user does not include the first compute instance.

6. The computer-implemented method of claim 5, wherein adding at least the threshold number of compute instances to the pool of compute instances comprises replacing a threshold amount of compute instances removed from the pool of compute instances.

7. The computer-implemented method of claim 5, wherein adding at least the threshold number of compute instances to the pool of compute instances comprises replacing the first compute instance in the pool subsequent to removing the first compute instance from the pool for executing the first task on behalf of the first user.

8. The computer-implemented method of claim 5, further comprising:
receiving a request to execute a second task on behalf of the first user on a compute instance selected from the pool of compute instances; and
prior to updating the resource usage associated with the first user to reflect the first compute instance being released, rejecting the request based at least in part on a determination that a threshold number of compute instances has not yet been added to the pool of compute instances.

9. The computer-implemented method of claim 5, further comprising:
receiving a request to execute a second task on behalf of the first user on a compute instance selected from the pool of compute instances; and
subsequent to updating the resource usage associated with the first user to reflect the first compute instance being released, assigning, based at least in part on the resource usage associated with the first user being within the resource limit associated with the first user, a second compute instance from the pool of compute instances to the first user for executing the second task thereon.

10. The computer-implemented method of claim 9, further comprising, before the second compute instance is released, updating the resource usage associated with the first user to allow an additional compute instance to be assigned to the first user.

11. The computer-implemented method of claim 5, further comprising:
determining that a second compute instance that is assigned to execute a second task on behalf of the first user has been released;
determining that a threshold number of compute instances has not yet been added to the pool of compute instances; and
subsequent to determining that the second compute instance has been torn down and added back to the pool of compute instances, updating the resource usage associated with the first user to reflect the second compute instance being released, wherein, subsequent to updating the resource usage, the resource usage does not include the second compute instance.

12. The computer-implemented method of claim 5, further comprising:
determining that a second compute instance that is assigned to execute a second task on behalf of the first user has been released due to the second task failing to execute or being terminated;
determining that a threshold number of compute instances has not yet been added to the pool of compute instances; and
subsequent to determining that a predetermined amount of time has passed since the second compute instance being released, updating the resource usage associated with the first user to reflect the second compute instance being released, wherein, subsequent to updating the resource usage, the resource usage does not include the second compute instance.

13. A non-transitory computer-readable medium storing instructions that, when executed by a computing system, cause the computing system to at least:
provide a pool of compute instances, wherein each compute instance in the pool is usable to execute a task on behalf of one of a plurality of users, wherein each user of the plurality of users is associated with a resource usage indicating a number of compute instances currently assigned to the user and a resource limit indicating a maximum number of compute instances allowed to be assigned to the user;
determine that a first compute instance that is assigned to execute a first task on behalf of a first user of the plurality of users has been released;

prior to updating the resource usage associated with the first user to reflect the first compute instance being released, determine that at least a threshold number of compute instances has been added to the pool of compute instances; and update the resource usage associated with the first user to reflect the first compute instance being released, wherein, subsequent to updating the resource usage, the resource usage does not include the first compute instance.

14. The non-transitory computer-readable medium of claim 13, wherein adding at least the threshold number of compute instances to the pool of compute instances comprises replacing a threshold amount of compute instances removed from the pool of compute instances.

15. The non-transitory computer-readable medium of claim 13, wherein adding at least the threshold number of compute instances to the pool of compute instances comprises replacing the first compute instance in the pool subsequent to removing the first compute instance from the pool for executing the first task on behalf of the first user.

16. The non-transitory computer-readable medium of claim 13, storing further instructions that, when executed by the computing system, cause the computing system to at least:

receive a request to execute a second task on behalf of the first user on a compute instance selected from the pool of compute instances; and prior to updating the resource usage associated with the first user to reflect the first compute instance being released, reject the request based at least in part on a determination that a threshold number of compute instances has not yet been added to the pool of compute instances.

17. The non-transitory computer-readable medium of claim 13, storing further instructions that, when executed by the computing system, cause the computing system to at least:

receive a request to execute a second task on behalf of the first user on a compute instance selected from the pool of compute instances; and subsequent to updating the resource usage associated with the first user to reflect the first compute instance being released, assign, based at least in part on the resource usage associated with the first user being within the resource limit associated with the first user, a second compute instance from the pool of compute instances to the first user for executing the second task thereon.

18. The non-transitory computer-readable medium of claim 13, storing further instructions that, when executed by the computing system, cause the computing system to at least:

determine that a second compute instance that is assigned to execute a second task on behalf of the first user has been released;

determine that a threshold number of compute instances has not yet been added to the pool of compute instances; and subsequent to determining that the second compute instance has been torn down and added back to the pool of compute instances, update the resource usage associated with the first user to reflect the second compute instance being released, wherein, subsequent to updating the resource usage, the resource usage does not include the second compute instance.

19. The non-transitory computer-readable medium of claim 13, storing further instructions that, when executed by the computing system, cause the computing system to at least:

determine that a second compute instance that is assigned to execute a second task on behalf of the first user has been released;

determine that a threshold number of compute instances has not yet been added to the pool of compute instances; and subsequent to determining that a predetermined amount of time has passed since the second compute instance being released, update the resource usage associated with the first user to reflect the second compute instance being released, wherein, subsequent to updating the resource usage, the resource usage does not include the second compute instance.

20. The non-transitory computer-readable medium of claim 13, wherein the pool of compute instances includes one or more of a virtual machine instance, a bare-metal instance, a physical machine, a container, a node, or an offload card.

* * * * *